3,382,610
METHOD OF COOLING SOIL IN HOT WEATHER TO ENABLE SEED GERMINATION

Richard L. Ferm, El Cerrito, Calif., assignor to Chevron Research Company, San Francisco, Calif., a corporation of Delaware
No Drawing. Filed Sept. 28, 1966, Ser. No. 582,502
2 Claims. (Cl. 47—9)

The present invention relates to an improvement in agriculture which permits effective germination of seeds sowed in summer in the soil of areas subjected to very high temperatures which otherwise would preclude seed germination.

In many regions the hot summer sun causes an undue increase in the temperature of the soil with the result that the seeds sowed therein suffer biological damages or, using simpler terms, become burned and are killed by the heat. It is well known, for instance, that sugar beets seeds will not germinate satisfactorily if the temperature of the soil is above 90° F. Similar difficulties occur in the case of lettuce, melons, tomatoes, and a number of other plants. These high soil temperatures are, however, prevalent in hot weather of summer months in certain arid but otherwise agriculturally attractive regions, for instance, in the Imperial Valley, in California.

In the past, to cool the soil sufficiently to prevent seed damage and to make possible its germination, the grower was forced to resort to irrigation water flooding. This is, however, a highly uneconomical method when used in arid areas of extreme water shortage and, additionally, it contributes to the build-up of salinity in the soil and thus diminishes its suitability for cultivation.

The present invention enables the grower to protect the seeded soil against overheating harmful to seeds and to achieve a substantial reduction in the temperature of the soil, which may range from above about 5° F. to as high as 30° F. This welcome improvement is obtained by coating the surface of the soil containing sowed seeds, as quickly as possible after sowing the seeds, with a composition consisting essentially of from about 10 to about 40% by weight of a bituminous, non-phytotoxic binder, and from about 5 to about 40% by weight of aluminum pigment, the balance to make 100% by weight being a volatile liquid petroleum hydrocaron solvent boiling in the range from about 120 to about 400° F. This composition, applied as a coating at the rate of at least 0.1 pound per one square yard of the seeded soil surface, and preferably from about 0.5 to about 3 pounds, insures an unexpected and highly desirable cooling of the soil to temperatures which are not conducive to damaging the seeds and do not preclude their germination. The coating may be applied either by spraying or atomizing it, for instance, in strips or bands over the center line of the seeded rows, the width of the strips being from at least about 2 to as much as 15 inches and even wider, while the distances between the rows being from about 20 to about 60 inches, measured from the center line of one row to the center line of the next row, in accordance with the conventional sowing practice for each particular kind of plant, whether beets, tomatoes, melons, lettuce, etc. The coating may also be applied by using a pulsating-type equipment to form protective, circular spots of from about 2 to about 10 inches in diameter over the seeded rows, regularly spaced from each other so as to overlay each seed.

The bituminous binder component of this protective coating formulation is preferably an asphalt characterized by a softening point in the range from about 100 to about 250° F., air-blown asphalts being preferred.

The aluminum pigment component mentioned hereinabove is leafing-grade aluminum, this type of aluminum possessing the best property for reflecting light and heat.

The volatile hydrocarbon solvent used to thin the bituminous binder and thus to facilitate the application of the coating can be any suitable petroleum naphtha thinner or the like, provided it is not phytotoxic.

The aforementioned soil-cooling composition is applied at such a rate by spraying or atomizing it in the field over the seeded rows, that the coating or film which results is sufficiently thin (from about 0.005 "to about 0.05") to make it penetrable by seedlings on germination. At the same time, the moisture in the soil is prevented from escaping into the air by the essentially impervious seal formed by the bituminous binder film, while the heat from sun rays is warded off by being reflected from the aluminum, whose flakes rise to the top surface as the solvent evaporates and until the coating sets. Furthermore, the reflection from the aluminum flake-contaiaining surface underneath the plant, after the seedling has emerged, enhances photosynthesis and results, as observed, in particular, in the case of corn, in a much higher yield per acre.

While the asphalt binder, the aluminum pigment, and the volatile hydrocarbon solvent constitute the three essential ingredients of the coating composition of this invention, conventional additives, in particular, inhibitors for retarding the oxidation of asphalt, resins compatible with asphalt and contributing toward sealing the surface of the soil and binding the aluminum flakes above it, and herbicides to forestall occurrence of weeds, etc., may be added to the formulation if their presence is thought to be desirable and is not interfering with the beneficial effects of the coating composition.

The surface of the soil is preferably level and made smooth before applying thereto the cooling composition or mixture; otherwise no unusual pretreatment is needed.

A typical instance of an effective application of the composition of this invention is given hereinafter.

Sugar beets have been planted in a field in the vicinity of Brawley, in Coachella Valley, Calif., where the temperatures during the day, beginning with June, rise to 95–105° F., and in July and August, reach 110–115° F. and often higher.

In an 80-acre field, sugar beet seeds were sowed in rows, in early August, spaced 32 to 36 inches apart. In each row, four sections, 50 feet long each, were coated with the composition of the invention, the remaining portions of the row remaining untreated. The soil-cooling formulation had the following composition: airblown asphalt (trademark "S. O. Petrolastic") characterized by a low cold flow and with a softening point of about 145° F. constituted 25% by weight of the composition; leafing-grade aluminum pigment (trademark "Alcoa") was used in the amount of 10% by weight; a mixture of volatile petroleum thinners sold under the trade name "Chevron Thinner" formed the remainder to 100% by weight (30% by weight being "Chevron Thinner No. 200" and 35% being "Chevron Thinner No. 350"). The surface of the soil in the test areas was leveled and smoothed first, whereupon the composition was sprayed over the seeded rows in continuous strips, 5 to 6 inches wide, at a rate of 0.35 pound per square yard. At the time of this treatment, the ambient temperature was as high as 118° F., while the temperature of the soil prior to the application of the coating was in the range of 110–115° F. After the coating was applied and had set, the temperature in the soil was observed to have been reduced at least 12° F. As a consequence, the seeds did germinate and the beet plants emerged from the ground, readily piercing through the aluminum-asphalt film. Eventually the aluminum-asphalt film crumbled up under the combined effects of weathering, sunshine and irrigation and became mixed with the soil, but by that time the survival of the emerged young plants was assured.

In the areas, selected for comparison in the same field and similarly seeded with sugar beet seeds, in which the cooling composition of the invention was not applied, very few seedlings were observed to emerge within the same period of time and later. In another plot in the same field, seeded with sugar beets, to which the coating composition of the invention was not applied, but in which irrigation water flooding was used, about five days of continuous irrigation was required to achieve comparable germination and plant emergence.

A similar comparison test was undertaken near Thermal, Calif., on tomatoes, which usually fail to germinate when the soil temperature xeceeds 75° F. In this case it was observed that only those seeds in the seeded rows coated with the asphalt-aluminum coating composition of the invention survived the heat (95° F. in the soil) and emerged as young plant seedlings on the surface, eventually fruiting with high yields of tomatoes. The seeds in the rows that had not been coated did not germinate and failed to sprout.

In conclusion, it is to be understood that the method of the present invention is not limited to the specifically mentioned plants, namely, lettuce, tomatoes, melons and sugar beets, but is equally effective in promoting germination of seeds of other plants likely to be damaged by the overheating of the soil in arid regions in very hot weather.

The above-described observations are thought, however, to be sufficient to illustrate convincingly the improvement achieved by the method of soil cooling in accordance with the invention, which is now claimed as follows.

I claim:

1. The method for protecting seeded soil against overheating, comprising coating the surface of the seeded rows of the soil with a composition consisting essentially of from about 10 to about 40% by weight of an asphalt characterized by a softening point in the range of from about 100 to about 250° F., from about 5 to about 40% by weight of leafing-grade aluminum, and a volatile, non-phytotoxic hydrocarbon solvent boiling in the range from about 120 to about 400° F. in an amount to bring the weight of the composition to 100%, said composition being applied over the surface of the soil at a rate of from about 0.1 to about 3 pounds per one square yard of the coated soil surface.

2. The method as defined in claim 1 wherein said coating composition is applied over the seeded rows of the soil in strips at least 2 inches wide.

No references cited.

ROBERT E. BAGWILL, *Primary Examiner.*